July 21, 1931. C. BOUILLON 1,815,490
FOLLOW REST
Filed May 21, 1930 3 Sheets-Sheet 1
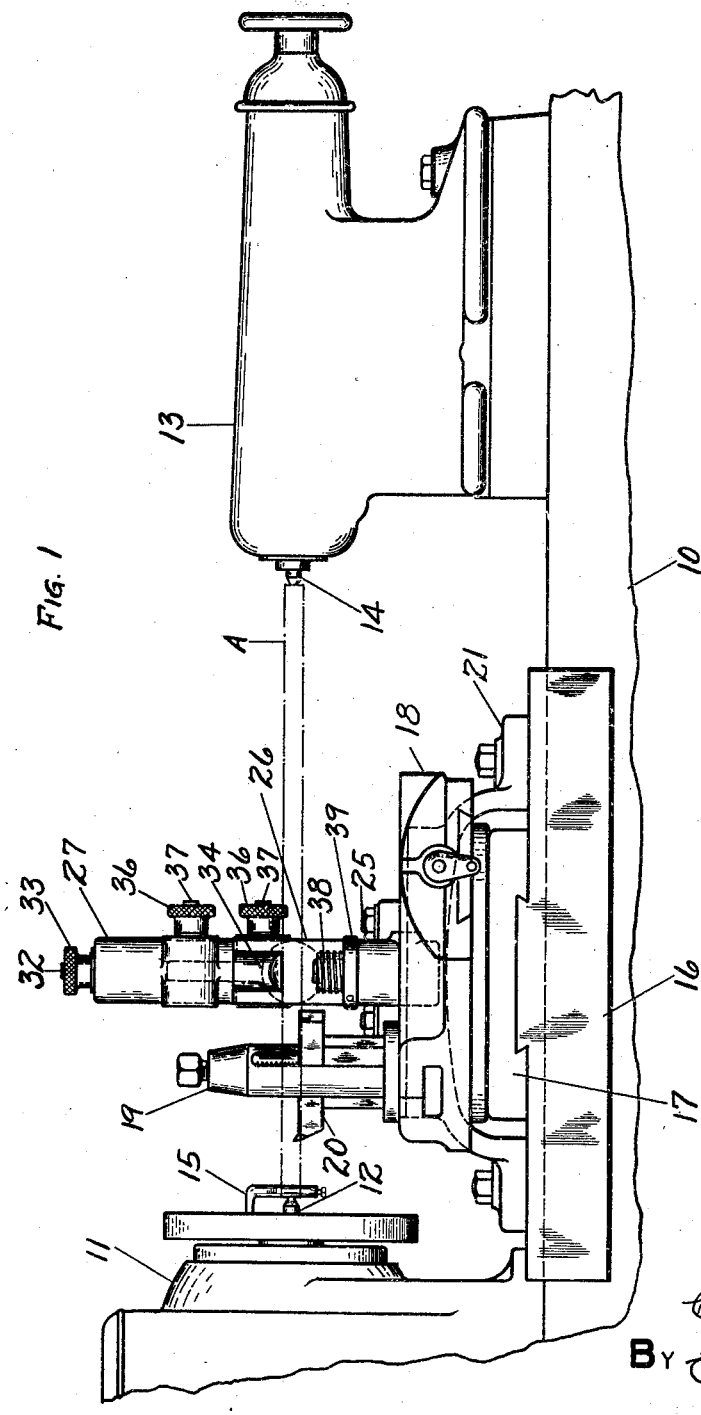
INVENTOR
Constant Bouillon
BY Ernest R. Llewellyn
ATTORNEY

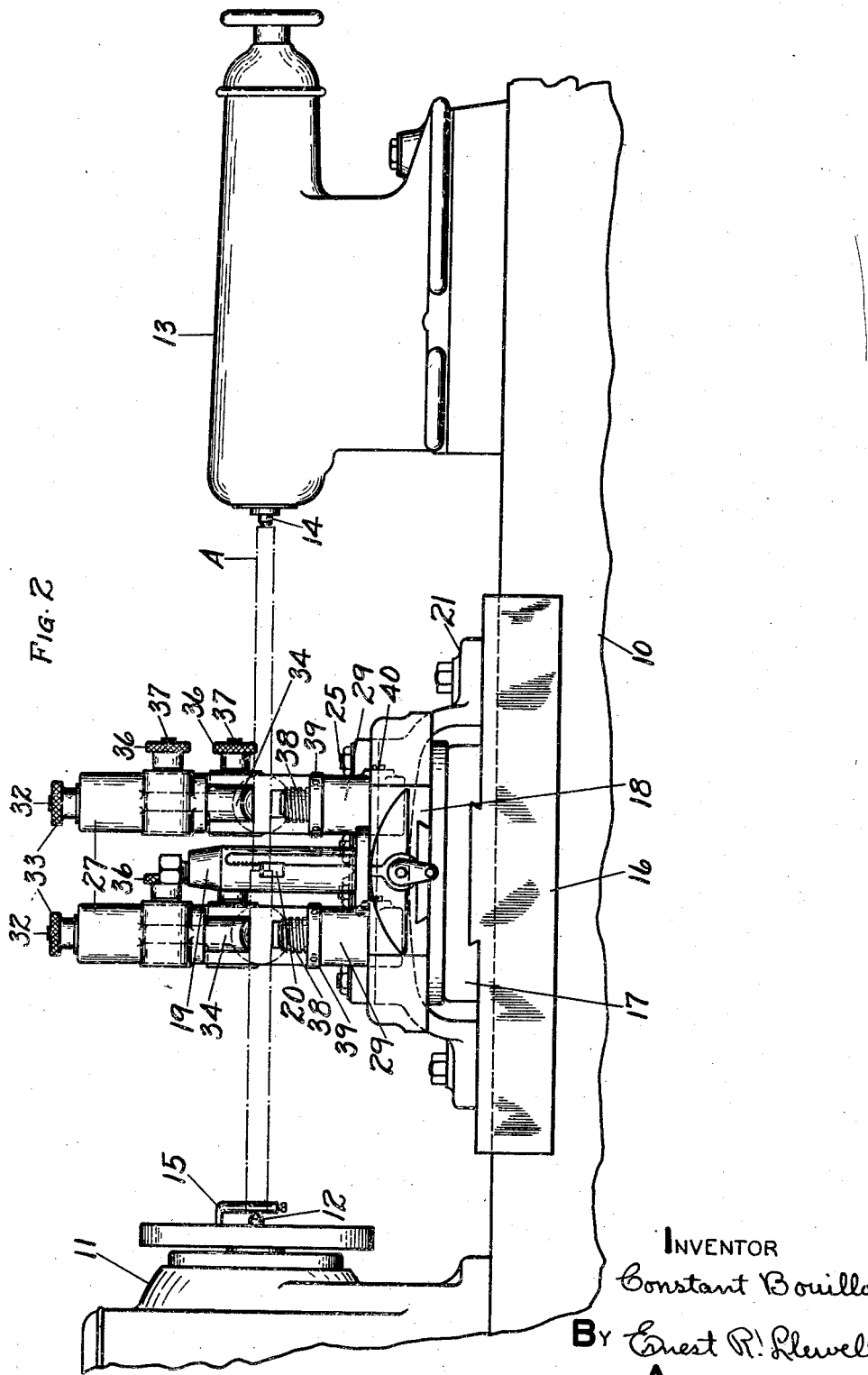

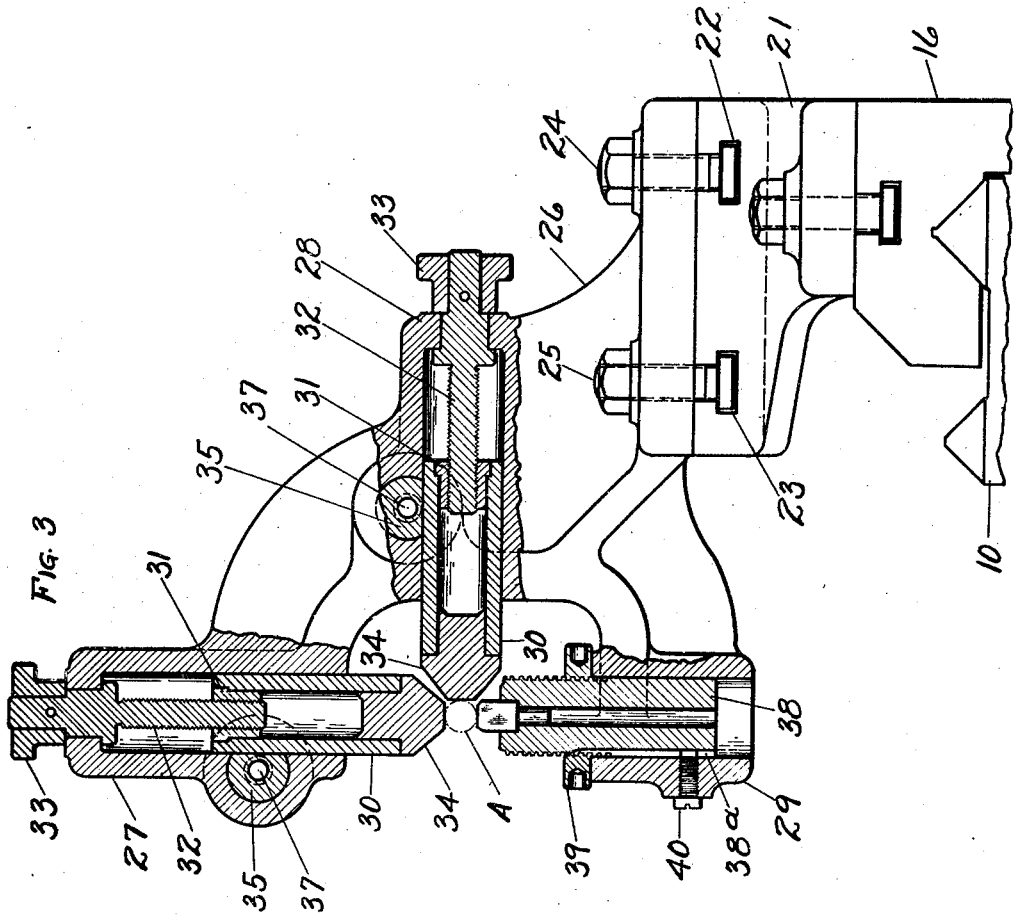

Patented July 21, 1931

1,815,490

UNITED STATES PATENT OFFICE

CONSTANT BOUILLON, OF TORRINGTON, CONNECTICUT, ASSIGNOR TO THE HENDEY MACHINE COMPANY, OF TORRINGTON, CONNECTICUT, A CORPORATION OF CONNECTICUT

FOLLOW REST

Application filed May 21, 1930. Serial No. 454,502.

This invention relates to a follow rest adapted for use on lathes and other machine tools of this character wherein the work is supported between centers as is best illustrated in a lathe. It is common practice, in performing a turning operation on work of a length and of insufficient diameter to properly support itself between the centers without deflection, to provide a single follow rest in juxtaposition to center the work axially relative to the cutting tool. The follow rest comprised a single frame secured to the usual carriage of the lathe and which is traversed in the well known manner. With the construction heretofore followed the follow-rest was fixed in predetermined position axially and relative to the cutting tool which is a decided disadvantage when it is desired to support the work as close to the cutting tool as conditions would permit.

The object of my present invention is to provide a follow-rest so constructed and arranged as to permit axial adjustment relative to the cutting-tool and which may, when desired, be positioned to precede the cutting or follow the cutting operation.

Another object in my present invention is a novel means for supporting and adjusting the follow-rest relative to the cutting tool.

A further object is to provide a supporting member whereby a plurality of follow-rests may be adjustably secured thereto. This permits of an arrangement whereby one follow-rest may be positioned to precede the cutting-tool, and when using one tool, the second rest is arranged to immediately follow the tool. With my axial adjustment these rates may be adjusted and positioned as close as is practical to the cutting tool, thus retaining the work in a rigid position during the cutting operation.

With the above and other objects in view my invention consists in a novel combination and arrangement of parts hereinafter described and more specifically pointed out in the appended claims.

In the accompanying drawings I have shown my invention attached to a lathe sufficient to enable those skilled in the art to understand the construction and operation thereof.

Referring to the drawings:—

Fig. 1 is a front elevation of a portion of a lathe having my follow-rest embodied therewith;

Fig. 2 is a view corresponding to Fig. 1, but shows the application of an auxiliary rest; and Fig. 3 is a side elevation of my follow-rest, a portion of which is broken away and shown in section.

In the drawings 10 is a portion of a lathe bed having a headstock 11 which has mounted therein a work supporting center 12. A tail-stock 13 is adjustably secured to the bed, said tail-stock having mounted therein a work supporting center 14. The work A is interposed between and supported by the centers 12 and 14. A work dog 15 is secured to the work A and rotated by the headstock spindle in the usual manner.

16 is the carriage mounted on the lathe bed and traversed in the usual manner, said carriage having slidably mounted thereon a cross-slide 17. A tool-rest 18 is slidably mounted on the cross-slide 17 and has attached thereto the tool-post 19, said tool-post having secured therein the cutting tool 20. The construction and operation of the above mentioned elements are well known in the art of lathe manufacture therefore further detailed description is unnecessary.

Secured to the carriage is a bridge member 21 that is provided with longitudinally extending T slots 22 and 23, for slidably retaining therein the heads of the clamping bolts 24 and 25 that secure the main member 26 of the follow rest to the bridge member 21.

The follow-rest member 26 has formed integral therewith the cylinder portions 27, 28 and 29. The cylinders 27 and 28 are adapted to have slidably mounted therein the jaws 30 which are provided, at their inner ends, with internally threaded nuts 31 that engage the externally threaded adjusting screws 32. The adjusting screws have their bearing in the closed end portion of the cylinders 27 and 28, said adjusting screws having secured to the outer ends thereof the knurled nuts 33. The inner ends of the jaws 30 are adapted to receive work contacts 34. Thru the revolving of the adjusting screws 32 the jaws 30 are positioned according to the diameter of the work, the contacts 34 engaging with the work.

Binder bushings 35, actuated by the knurled nuts 36 and studs 37, engaged with the jaws 30 to lock said jaws and contacts 34 in their engaging position.

The cylinder 29 has slidably mounted therein a jaw 38, the outer end of which is externally threaded to engage with the internal thread of the elevating nut 39. The jaw 38 is provided with a recess 38a that is engaged by the guide screw 40 which prevents the jaw 38 from revolving when the elevating nut 39 is actuated to adjust said jaw 38 relative to the work A.

It will thus be seen that I have provided a follow rest wherein the horizontal pressure of the cutting tool is absorbed by the horizontal contact member, the lifting pressure exerted by the chip being cut is absorbed by the superimposed contact member while the third contact member eliminates any possible downward deflection. With this combination and arrangement of parts it is possible to arrange two or more follow rests and adjust them axially in sequence as heretofore mentioned and, if desired, permitting the use of dual cutting tools interposed between the follow rests.

Having thus described my invention it will be evident that many changes and modifications may be made therein by those skilled in the art, therefore, I do not wish to be limited to the specific details disclosed, but what I claim is:—

1. A lathe carriage having slidably mounted thereon a transverse slide, a tool support mounted on said transverse slide, a bridge member secured to said carriage, dual follow-rests adjustably secured to said bridge member and movable with said carriage.

2. A lathe carriage having slidably mounted thereon a transverse slide, a tool support mounted on said transverse slide, a bridge member secured to said carriage, dual follow-rests adjustably secured to said bridge member and movable with said carriage, said dual follow-rests supporting a plurality of radially adjustable work contacts.

3. A lathe carriage having slidably mounted thereon a transverse slide, a tool support mounted on said slide, a bridge member secured to said carriage, dual follow-rests in spaced relation to said tool support, said rests being adjustably secured to said bridge member and movable with said carriage, said follow rests supporting a plurality of adjustable work contacts.

4. A lathe carriage having slidably mounted thereon a transverse slide, a tool support mounted on said transverse slide, a bridge member secured to said carriage, a follow-rest adjustably secured to said bridge member and movable with said carriage.

5. A lathe carriage having slidably mounted thereon a transverse slide, a tool support mounted on said transverse slide, a bridge member secured to said carriage, a follow-rest adjustably secured to said bridge member and movable with said carriage, said follow-rest supporting a plurality of radially adjustable work contacts.

In testimony whereof I have hereunto set my hand.

CONSTANT BOUILLON.